United States Patent
Zhong et al.

(10) Patent No.: US 11,865,620 B2
(45) Date of Patent: Jan. 9, 2024

(54) ADDITIVE MANUFACTURING SYSTEM AND METHOD

(71) Applicant: General Electric Company, Schenectady, NY (US)

(72) Inventors: Dalong Zhong, ShangHai (CN); Yingna Wu, ShangHai (CN); Zirong Zhai, ShangHai (CN); Yong Wu, ShangHai (CN); Hai Chang, ShangHai (CN); Bin Wei, Niskayuna, NY (US); Lyle Timothy Rasch, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 16/959,572

(22) PCT Filed: Dec. 21, 2018

(86) PCT No.: PCT/US2018/067074
§ 371 (c)(1),
(2) Date: Jul. 1, 2020

(87) PCT Pub. No.: WO2019/135946
PCT Pub. Date: Jul. 11, 2019

(65) Prior Publication Data
US 2021/0078078 A1 Mar. 18, 2021

(30) Foreign Application Priority Data
Jan. 2, 2018 (CN) .......................... 201810002030.4

(51) Int. Cl.
*B22F 12/10* (2021.01)
*B22F 3/17* (2006.01)
(Continued)

(52) U.S. Cl.
CPC .................. *B22F 3/17* (2013.01); *B22F 3/06* (2013.01); *B22F 10/25* (2021.01); *B22F 10/50* (2021.01);
(Continued)

(58) Field of Classification Search
CPC ...................................................... B22F 12/10
See application file for complete search history.

(56) References Cited

U.S. PATENT DOCUMENTS

| | | | |
|---|---|---|---|
| 2016/0312338 A1 | 10/2016 | Miller | |
| 2017/0008126 A1* | 1/2017 | Long | ........................ B22F 10/28 |
| 2018/0371594 A1* | 12/2018 | Raghavan | .............. B24B 39/003 |

FOREIGN PATENT DOCUMENTS

| | | |
|---|---|---|
| CN | 103962560 A | 8/2014 |
| CN | 204289543 U | 4/2015 |

(Continued)

OTHER PUBLICATIONS

Combined Chinese Search Report and Office Action Corresponding to Application No. 201810002030 dated Dec. 1, 2020.
(Continued)

*Primary Examiner* — Christopher S Kessler
(74) *Attorney, Agent, or Firm* — Dority & Manning, P.A.

(57) ABSTRACT

An additive manufacturing system, comprises an energy source device for providing a first energy beam and a second energy beam; and a forging device comprising a forging head. The first energy beam and a substrate are configured to move relative to each other to fuse at least a portion of a material added to the surface of the substrate for forming a cladding layer on the substrate. The forging head is configured to forge the cladding layer during formation of the cladding layer. The second energy beam is configured to heat a forging area of the cladding layer.

15 Claims, 5 Drawing Sheets

(51) Int. Cl.
  *B33Y 40/00*   (2020.01)
  *B22F 3/06*    (2006.01)
  *B22F 10/50*   (2021.01)
  *B22F 12/63*   (2021.01)
  *B22F 10/25*   (2021.01)
  *B22F 12/33*   (2021.01)
  *B22F 12/45*   (2021.01)
  *B33Y 10/00*   (2015.01)
  *B33Y 30/00*   (2015.01)
  *B22F 12/46*   (2021.01)
  *B22F 12/53*   (2021.01)
  *B22F 10/36*   (2021.01)

(52) U.S. Cl.
  CPC .............. *B22F 12/10* (2021.01); *B22F 12/33* (2021.01); *B22F 12/45* (2021.01); *B22F 12/63* (2021.01); *B33Y 40/00* (2014.12); *B22F 10/36* (2021.01); *B22F 12/46* (2021.01); *B22F 12/53* (2021.01); *B22F 2999/00* (2013.01); *B33Y 10/00* (2014.12); *B33Y 30/00* (2014.12)

(56) References Cited

FOREIGN PATENT DOCUMENTS

| | | |
|---|---|---|
| CN | 106735221 A | 5/2017 |
| CN | 106825574 A | 6/2017 |
| CN | 10722544 A | 10/2017 |
| CN | 107262713 A | 10/2017 |
| CN | 107287588 A | 10/2017 |
| CN | 107297504 A | 10/2017 |

OTHER PUBLICATIONS

PCT International Search Report Corresponding to PCT/US2018/067074 dated Apr. 22, 2019.

* cited by examiner

ADDITIVE MANUFACTURING SYSTEM AND METHOD

BACKGROUND

The present disclosure relates generally to a field of additive manufacturing technology, and more particularly to an additive manufacturing system and method.

Additive manufacturing, also known as 3D printing, is an advanced manufacturing technology that can be used for direct formation of complex structures through layering of materials. However, the layer-by-layer cumulative forming in the additive manufacturing process may result in defects. These defects, such as holes, pores and other defects may be almost inevitably generated in a final formed part. Sometimes microcracks are easily built in most of the final formed parts fabricated by the additive manufacturing. Even using a material with the best formability to form the parts by additive manufacturing, and combining with a hot isostatic pressing, heat treatment or other post-processing processes, the mechanical properties of the final formed parts, such as fatigue performance, still can't meet the standard of conventional forging parts.

In particular, if the additive manufacturing technology are used for forming metal parts, the final metallic parts may inevitably have some defects, such as porosity, cracks, shrinkage, swelling and so on. These defects may lead to a big gap between the final metallic parts in the mechanical, electrical, and other properties with the real product requirements.

Therefore, there is a need to provide a novel additive manufacturing system and an additive manufacturing method to address at least one of the above-mentioned problems.

BRIEF DESCRIPTION

In one embodiment, the present disclosure provides an additive manufacturing system. The additive manufacturing system comprises an energy source device and a forging device. The energy source device is used to provide a first energy beam and a second energy beam. The forging device comprises a forging head. The first energy beam moves along a surface of a substrate to fuse at least a portion of a material added to the surface of the substrate to form a cladding layer on the substrate. The forging head is configured to forge the cladding layer during formation of the cladding layer. The second energy beam is configured to heat a forging area of the cladding layer.

In another embodiment, the present disclosure provides an additive manufacturing method. The manufacturing method comprises moving a first energy beam along a surface of a substrate to fuse at least a portion of a material added to the surface of the substrate for forming a cladding layer on the substrate. Forging the cladding layer during formation of the cladding layer using a forging device comprising a forging head. Heating a forging area of the cladding layer using a second energy beam.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, the terms "connected" and "coupled" are not restricted to physical or mechanical connections or couplings, and can comprise electrical connections or couplings, whether direct or indirect.

Embodiments of the present disclosure may be described herein in terms of functional components and various processing steps. It should be appreciated that such functional components may be realized by any number of hardware, software, and/or firmware components configured to perform the specific functions. For example, an embodiment of the present disclosure may employ various integrated circuit components, e.g., memory elements, digital signal processing elements, logic elements, look-up tables, or the like, which may carry out a variety of functions of "controller" under the control of one or more microprocessors or other control devices. Moreover, the system described herein merely illustrates one exemplary embodiment.

The present disclosure relates to an additive manufacturing system and an additive manufacturing method, and more particularly to an additive manufacturing system and an additive manufacturing method be applicable to various metal materials, alloy materials, super-alloy materials, and composite materials.

Figure 1:
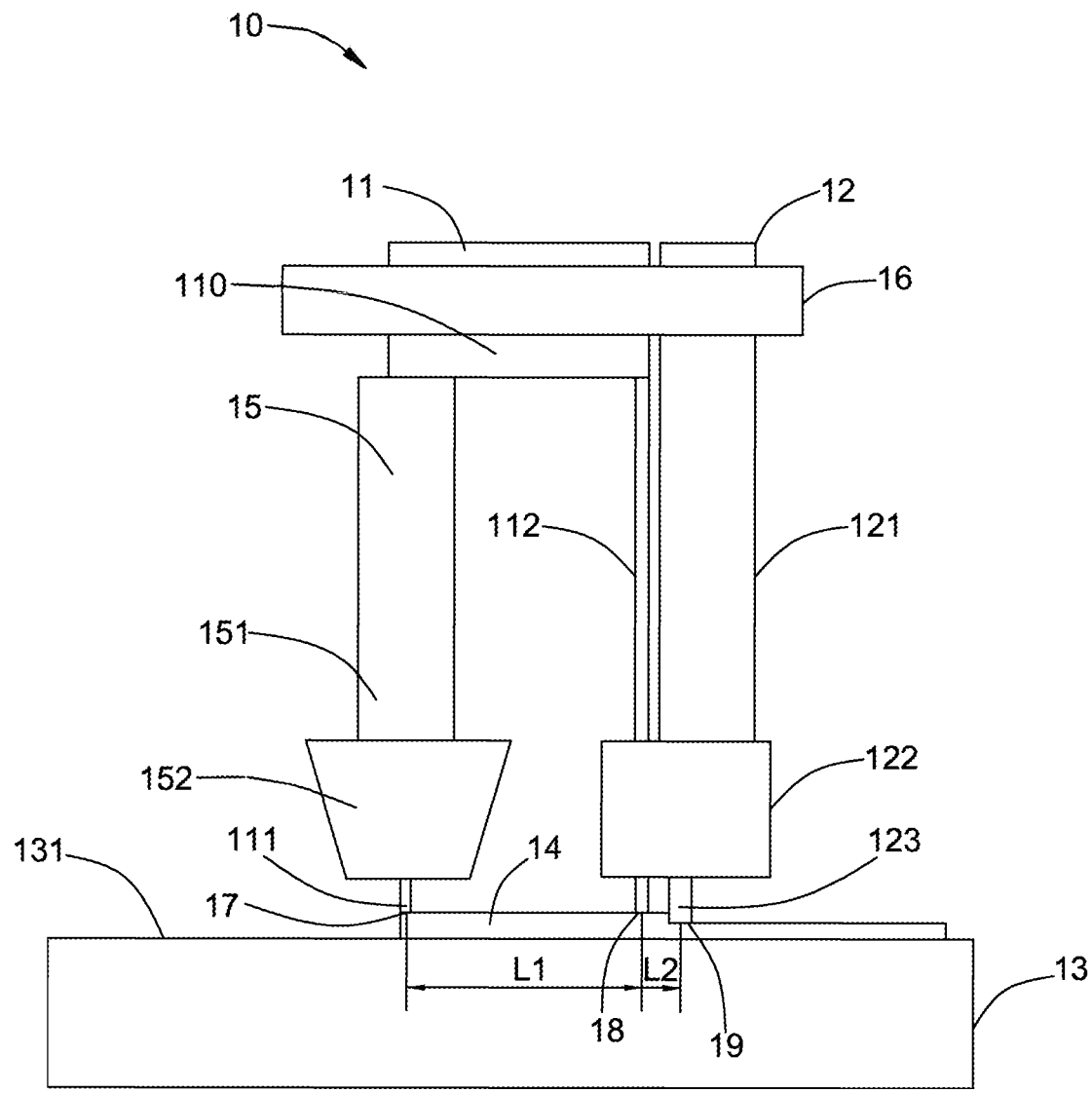
FIG. 1 is a schematic view of an additive manufacturing system in accordance with an embodiment of the present disclosure.

FIG. 1 is a schematic view of an additive manufacturing system 10 in accordance with an exemplary embodiment of the present disclosure. The additive manufacturing system 10 comprises an energy source device 11 and a forging device 12. The energy source device 11 is configured to emit a first energy beam 111 and a second energy beam 112 to a surface 131 of a substrate 13.

The energy source device 11 can move the first energy beam 111 and the second energy beam 112 along a surface 131 of the substrate 13. The energy source device 11 may comprise one or more energy sources, and the first energy beam 111 and the second energy beam 112 may be provided either by a same energy source, or by different energy sources. In this embodiment, the energy source device 11 comprises an energy source 110. The first energy beam 111 and the second energy beam 112 are both provided by the energy source 110. In this embodiment, the first energy beam 111 and the second energy beam 112 move relative to the substrate 13, and the substrate 13 is stationary.

In some embodiments, the energy source device is stationary. Thus, the first energy beam and the second energy beam emitted from the energy source are also stationary. And the substrate moves relative to the first energy beam and the second energy beam along a track of forming a cladding layer formed by the first energy beam. In some embodiments, the first energy beam and the second energy beam and the substrate move at the same time along a same direction for forming a cladding layer on the substrate.

In some embodiments, the additive manufacturing system 10 further comprises a feeding device 15. The feeding device 15 comprises a connecting mechanism 151 and a feeding mechanism 152. The connecting mechanism 151 is configured to connect the feeding device 15 to the energy source device 11. Thus, the feeding device 15 and the energy source device 11 can be linked, such that the feeding device 15 can move together with the energy source device 11. The feeding mechanism 152 is configured to add a material to the surface 131 of the substrate 13. The feeding mechanism 152 comprises a feeding nozzle. The feeding mechanism 152 may also comprise other types of feeding mechanisms, such as a powder feeder, a wire feeder, etc. The feeding device 15 generally comprises a hollow structure through which the first energy beam 111 can pass. The first energy beam 111 can fuse the material added to the surface 131 of the substrate 13 by the feeding mechanism 152, to form the cladding layer 14 on the surface 131 of the substrate 13.

In some embodiments, the material may be added to the substrate 13 by the feeding device 15 while the energy source 110 emits the first energy beam 111 toward the surface 131 of the substrate 13. The material can be melted by the first energy beam 111 to form a cladding layer 14 on the surface 131 of the substrate 13.

In some embodiments, the first energy beam 111 may directed to a material that has been pre-set on the surface 131 of the substrate 13. The pre-set material can be melted by the first energy beam 111. And the cladding layer 14 is formed on the surface 131 of the substrate 13.

In some embodiments, the material may be powder or filaments. The material may be metal powder, alloy powder, super-alloy powder, composite powder, metal filaments, alloy filaments, super-alloy filaments, and composite filaments. In some embodiments, the feeding device 15 comprises a powder feeding nozzle or a wire feeding device coaxial with the first energy beam 111. For example, in the embodiment shown in FIG. 1, the feeding device 15 comprises a powder feeding nozzle 152, coaxial with the first energy beam 111. The material delivered by the feeding device 15 is in the form of powder. Specifically, the powder feeding nozzle 152 comprises a coaxial powder feeding passage and a first energy beam passage, and the central axis of the powder flow formed by the powder material flowing in the powder feeding passage is approximately the same as the central axis of the first energy beam. Through the coaxial arrangement, it can provide a stable and uniform powder flow with good convergence to avoid interference. In some embodiments, the material conveyed by the feeding device may be in the form of a wire. The feeding device may comprise a wire feeding device coaxial with the first energy beam 111. In some embodiments, the feeding device may be disposed not coaxially with the first energy beam. For example, a conveying path of the material does not coincide with the central axis of the first energy beam 111. In some embodiments, the material may comprise a nickel-based alloy powder or wire.

The forging device 12 is configured to forge at least a portion of the cladding layer 14 layer by layer while the cladding layer 14 is formed on the substrate 13 layer by layer. The forging device 12 comprises a base portion 121 and a fixing portion 122 connected to the base portion 121. The forging device 12 further comprises a forging head 123 fixed on a bottom end of the fixing portion 122. The base portion 121 is connected to a connecting device 16 for moving the forging head 123 relative to the substrate 13 along a track of forming the cladding layer 14 formed by the first energy beam 111. The fixing portion 122 is connected with the base portion 121. The fixing portion 122 have a passage for the second energy beam 112 passing through. The forging head 123 can move vertically with respect to the base portion 121 of the forging device 12. During the formation of the cladding layer 14, the forging head 123 may be in contact with a surface of the cladding layer 14 to strike, impact, or press a portion of the cladding layer 14. Thus, the cladding layer 14 is forged during the formation of the cladding layer 14. In some embodiments, the forging may be implemented by different methods, such as hammering, rolling, impacting, pressing, and other forging method.

In some embodiments, the forging head and the substrate are configured to move relative to each other along a track of forming a cladding layer formed by the first energy beam. In some embodiments, the forging head moves along a track of forming a cladding layer formed by the first energy beam, and the substrate is stationary. In some embodiment, the substrate moves along a track of forming a cladding layer formed by the first energy beam, and the forging head is stationary. In some embodiments, the forging head and the substrate move relative to each other along a track of forming a cladding layer formed by the first energy beam. The forging head and the substrate move on a same direction.

The forging head 123 can move along a track of the cladding layer 14 formed by the first energy beam 111, and have the same movement direction as the first energy beam 111 so as to forge the cladding layer 14 in real time during the forming of the cladding layer 14. Thus, it can achieve strengthening impact on the cladding layer 14 to eliminate or reduce defects such as voids, pores, micro-cracks, and others defects during formation of the cladding layer 14. Thereby it can increase the densification of the final parts. In addition, it can also change the microstructure of the final cladding layer, for example promote recrystallization of the material of the cladding layer and formation of a fine equiaxed microstructure.

The second energy beam 112 emitted by the energy source 110 moves in the same direction with the first energy beam 111, which also coincides with the movement direction of the forging head 123. The second energy beam 112 is used to heat a forging area of the cladding layer 14 to ensure the forging area forged by the forging head 123 within a desired forging temperature range. Thus, the forging area of the cladding layer 14 can be maintained at a relatively stable temperature range. It is good for the forging device 12 to facilitate in-situ forging the cladding layer 14 consistently at the desired forging temperature during formation of the cladding layer 14. It also can prevent the in-situ forged cladding layer from cooling too fast. It can reduce the damage to the forging head 123 so as to prolong the service life of the forging head 123. In addition, it enables a reliable hybrid additive manufacturing process for producing the final parts with uniform forged properties.

In some embodiments, both the energy source 110 and the forging head 123 are movable. In some embodiments, the energy source 110 and the forging head 123 move simultaneously. In some embodiments of the present disclosure, the forging head 123 moves along a track along which the first energy beam 111 moves. In this embodiment, as one preferable solution, the additive manufacturing system 10 further comprises a connecting device 16 for interlocking the forging device 12 and the energy source 110. The connecting device 16 can move the forging head 123 according to the movement of the energy source 110. In some embodiments, the movement of the energy source 110 and the movement of the forging head 123 may also be independent from each other.

The parameters of the first energy beam 111 and the second energy beam 112 transmitted from the energy source 110 (such as the transmission time, the transmission power and other parameters) may be adjusted according to actual manufacturing needs. The parameters of the first energy beam 111 and the parameters of the second energy beam 112 may be same or different. In some embodiments, the first energy beam 111 is mainly used to fuse the material added to the substrate 13. Generally, a transmitting power of the first energy beam 111 is set for enabling the material to reach a molten state. The parameters of the first energy beam 111 can be optimally set based on the deposition rate of the material, the three-dimensional geometry of the parts to be manufactured, and the quality requirements of the final parts. The second energy beam 112 is mainly used to heat the in-situ forging area of the cladding layer 14 to maintain the in-situ forging area of the cladding layer 14 within a relatively stable desired forging temperature range. The second energy beam 112 doesn't need to make the cladding layer 14 to reach the molten state again, so the transmission power of the second energy beam 112 is generally less than the transmission power of the first energy beam 111.

In some embodiments, the second energy beam 112 and the first energy beam 111 may also be emitted by different energy sources. The first energy beam 111 and the second energy beam 112 may be the same kinds of energy beams, or may be different kinds of energy beams. The first energy beam 111 may comprise at least one of a laser beam, an electron beam, and a plasma arc beam. The second energy beam 112 may also comprise at least one of a laser beam, an electron beam, and a plasma arc beam.

In some embodiments, the forging head 123 of the forging device 12 comprises a columnar hammer. The columnar hammer 123 contacts the area of the cladding layer to be forged. For example, the columnar hammer 123 contacts a portion of the cladding layer 14 which is heated by the second energy beam 112. The portion of the cladding layer 14 is forged by the columnar hammer 123 through its up-and-down movements. In some embodiments, the movement direction of the forging head 123 is substantially perpendicular to the surface of the cladding layer 14. The forging head 123 may also comprise a hammer of other shapes. Of course, the forging head is not limited to the hammer, and it may be other suitable forging heads.

In some embodiments, the second energy beam 112 is disposed between the first energy beam 111 and the forging head 123 to heat the desired in-situ forging area of the cladding layer 14 firstly. Thus, the desired in-situ forging area of the cladding layer 14 is maintained within a relatively stable temperature range. It can change the microstructure of the cladding layer, improve the forging effect, and reduce the damage to the forging head 123. Thus, it can prolong the service life of the forging head 123. In addition, the forging effect on the cladding layer 14 is enhanced by effectively eliminating the defects such as pores and cracks during formation of the cladding layer. Additionally, it can change the microstructure of the final cladding layer and increase the densification of the final parts.

The second energy beam 112 is disposed nearer to the forging head 123 so as to maintain the desired in-situ forging area of the cladding layer within the desired forging temperature range. Thus, the cladding layer can be easily to be forged. The forging temperature range required for forging the cladding layer 14 is generally close to the forging temperature of the material, which generally depends on the specific materials. The power setting of the second energy beam 112 is also related to the forging temperature. In some embodiments, the material is a nickel-based alloy material, and the required forging temperature is generally maintained at 980 to 1100 degrees Celsius.

A distance L1 between a first contacting point 17 where the first energy beam 111 contacts the cladding layer 14 and a second contacting point 18 where the second energy beam 112 contacts the cladding layer 14 is generally greater than a distance L2 between the second contacting point 18 and a third contacting point 19 where the forging head 123 contacts the cladding layer 14. The distance L1 between the first contacting point 17 and the second contacting point 18 is generally 5 millimeters or more. In some embodiments, in order to improve the efficiency of the additive manufacturing system which can enable the additive manufacturing process followed by the in-situ forging process, the distance L1 between the first contacting point 17 and the second contacting point 18 is generally between 10 millimeters and 80 millimeters. In order for the second energy beam 112 to effectively heat the desired forging area of the cladding layer 14, the distance L2 between the second contacting point 18 and the third contacting point 19 generally needs to be less than or equal to 15 millimeters. In some embodiments, the distance between the second contacting point 18 and the third contacting point 19 is maintained at about 5 millimeters. Of course, the distance parameters mentioned in the present disclosure are not limited to the above embodiments, and it may fluctuate within a reasonable range.

Figure 2:
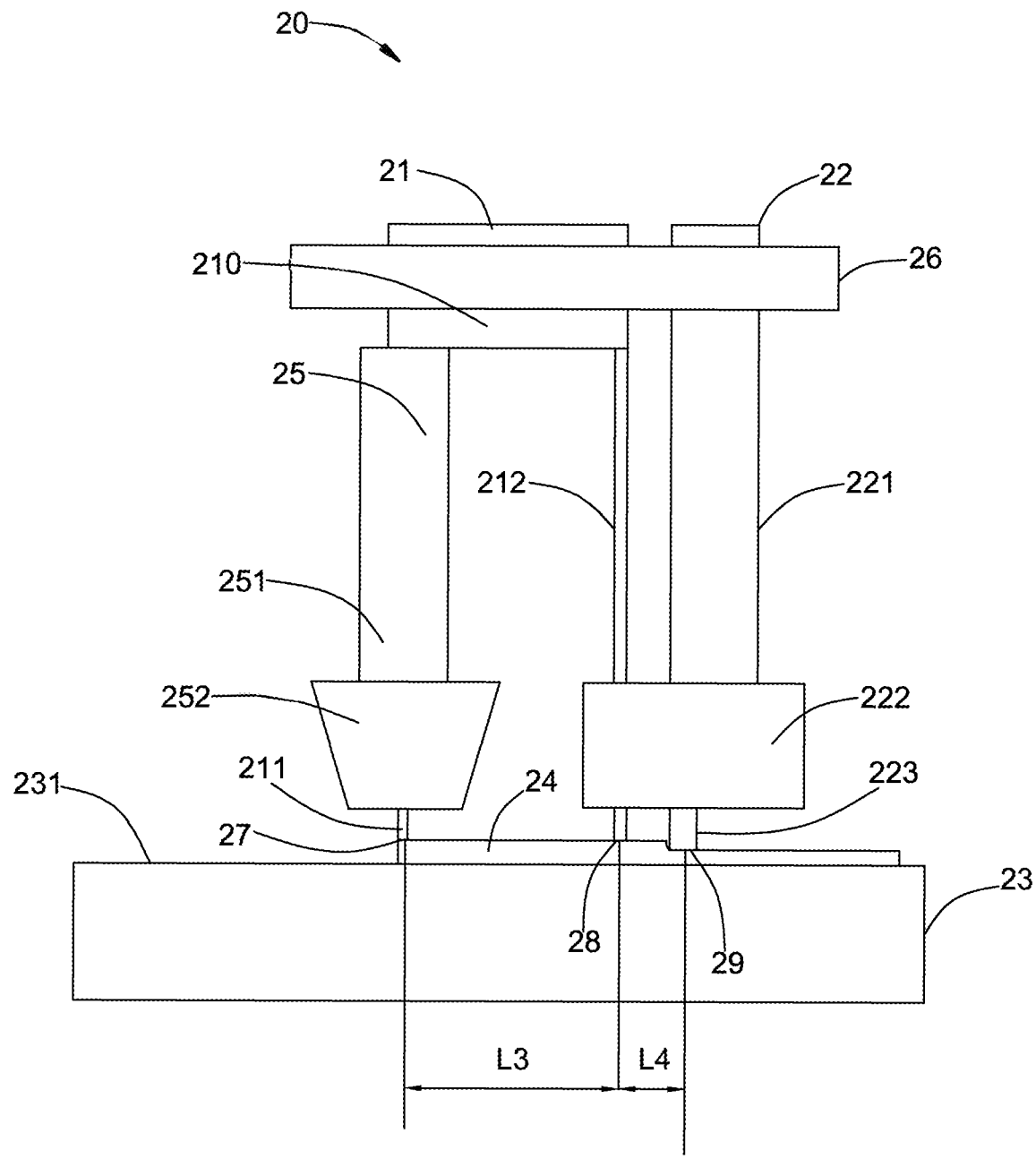
FIG. 2 is a schematic view of an additive manufacturing system in accordance with an embodiment of the present disclosure.

FIG. 2 shows a schematic view of an additive manufacturing system 20 according to one embodiment. The additive manufacturing system 20 comprises an energy source device 21 and a forging device 22. The energy source device 21 is configured to emit a first energy beam 211 and a second energy beam 212 to a substrate 23. In this embodiment, the energy source device 21 comprises an energy source 210. The first energy beam 211 and the second energy beam 212 are both provided by the energy source 210. The additive manufacturing system 20 further comprises a feeding device 25. The feeding device 25 comprises a connecting mechanism 251 and a feeding mechanism 252. The connecting mechanism 251 is configured to connect the feeding device 25 to the energy source 210 so that the feeding device 25 and the energy source 210 can be linked. The feeding device 252 can move together with the energy source device 21. The feeding mechanism 252 is configured to add a material to the surface 231 of the substrate 23. The feeding mechanism 252 comprises a feeding nozzle. Of course, the feeding mechanism 252 may comprise feeding mechanisms of other shapes, such as a powder feeder, a wire feeder, and so on. The feeding device 25 generally comprises a hollow structure through which the first energy beam 211 can pass. The first energy beam 211 can fuse the material added to the surface 231 of the substrate 23 by the feeding mechanism 252 to form the cladding layer 24 on the surface of the substrate 23.

The forging device 22 comprises a base portion 221 and a fixing portion 222 located below the base portion 221. The forging device 22 further comprises a forging head 223 connecting to the fixing portion 222. The forging head 223 is used to forge a portion of the cladding layer 24 during the formation of the cladding layer 24. The fixing portion 222 further comprises a cavity for the second energy beam 212 to pass through. The second energy beam 212 and the first energy beam 211 have the same movement directions. The second energy beam 212 can be used to heat the desired forging area of the cladding layer 24 near to the forging head 223 during the formation of the cladding layer 24. The forging head 223 moves along a track of a cladding layer 24 formed by the first energy beam 211. A distance L3 between a first contacting point 27 where the first energy beam 211 contacts the cladding layer 24 and a second contacting point 28 where the second energy beam 212 contacts the cladding layer 24 is greater than a distance L4 between the second contacting point 28 and a third contacting point 29 where the forging head 223 contacts the cladding layer 24.

The components, working principle, operating process and parameters of the additive manufacturing system 20 shown in FIG. 2 is basically the same as those of the additive manufacturing system 10 shown in FIG. 1, and will not be described in detail herein again. The main difference is that, in order to increase the design flexibility of the additive manufacturing system, the distance L4 between the second contacting point 28 and the third contacting point 29 can be relatively larger. It means that the distance L4 can be set relatively larger, for example, as about 15 millimeters. It also can heat the desired in-situ forging area of the cladding layer 24 to maintain the desired in-situ forging area within a suitable forging temperature range. Thus, it can improve the efficiency of the additive manufacturing system, reduce the damage to the forging head 223, and increase the densification of the final parts.

Figure 3:
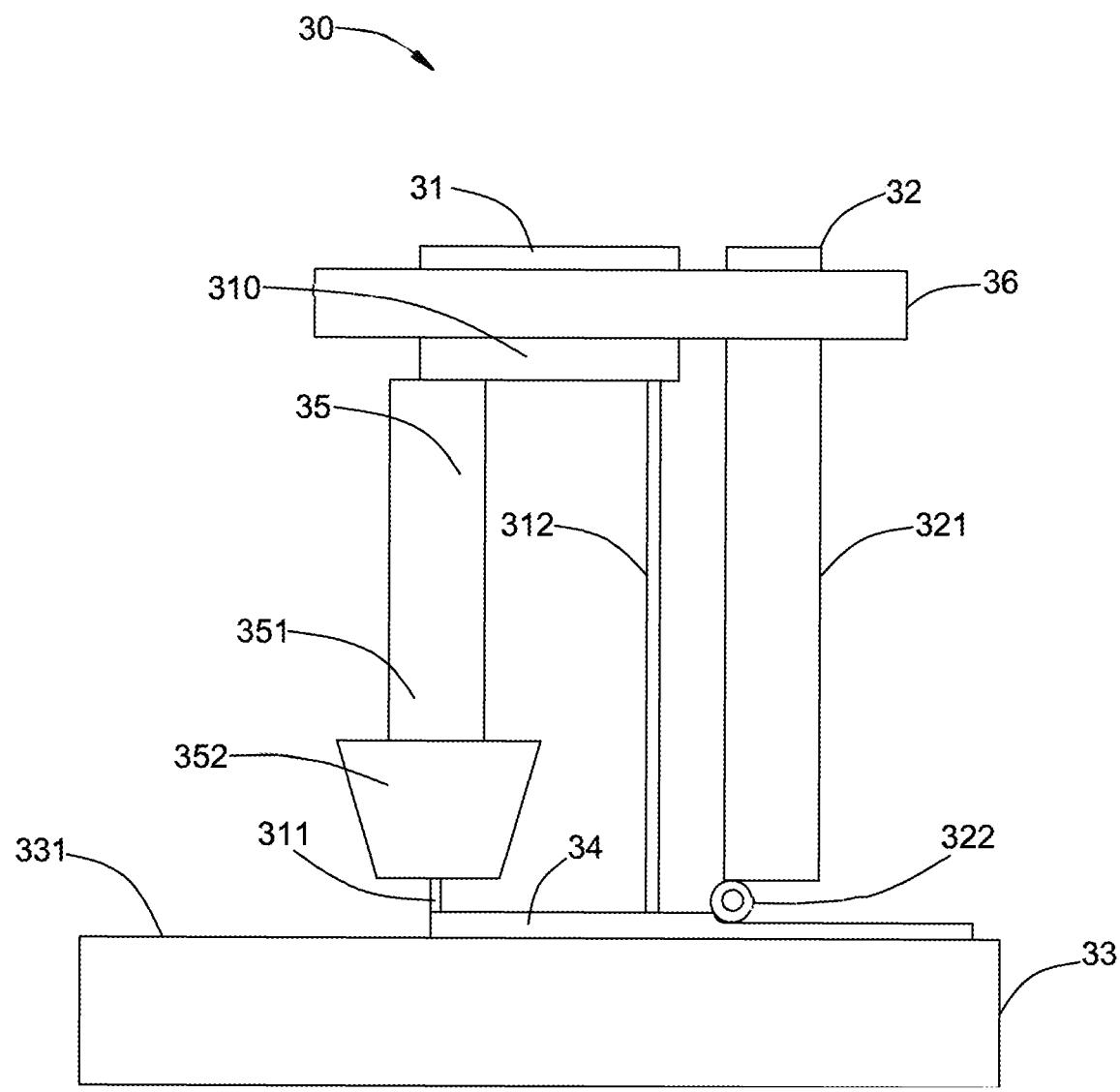
FIG. 3 is a schematic view of an additive manufacturing system in accordance with an embodiment of the present disclosure.

FIG. 3 shows a schematic view of an additive manufacturing system 30 according to one embodiment of the present disclosure. The additive manufacturing system 30 shown in FIG. 3 comprises an energy source device 31 and a forging device 32. The energy source device 31 is used to emit a first energy beam 311 and a second energy beam 312 to a substrate 33. In this embodiment, the energy source device 31 comprises an energy source 310. The first energy beam 311 and the second energy beam 312 are both provided by the energy source 310. The additive manufacturing system 30 further comprises a feeding device 35. The feeding device 35 comprises a connecting mechanism 351 and a feeding mechanism 352. The connecting mechanism 351 is configured to connect the feeding device 35 to the energy source 310 so that the feeding device 35 and the energy source 31 can be linked. The feeding device 35 can move together with the energy source 310. The feeding mechanism 352 comprises a feeding nozzle. Of course, the feeding mechanism 352 may comprise feeding mechanisms of other shapes, such as a powder feeder, a wire feeder, and so on. The feeding mechanism 352 is used to add a material to the substrate 33. The feeding device 35 comprises a hollow structure through which the first energy beam 311 can pass to fuse the material added on a surface 331 of the substrate 33 for forming the cladding layer 34 on the substrate 33.

The components, working principle, operating process and parameters of the additive manufacturing system 30 shown in FIG. 3 is basically the same as those of the additive manufacturing system shown in FIG. 1 and FIG. 2, and will not described in detail herein again. The main difference is that the forging device 32 comprises a base portion 321 and a forging head 322 fixed on the base portion 321. The forging head 322 differs from the forging heads of the first embodiment and second embodiment. The forging head 322 comprises a circular roller. The additive manufacturing system 30 further comprises a connecting device 36, so that the energy source device 31 and the forging device 32 can be linked. The forging device 32 can move together with the energy source device 31. The forging head 322 can be reciprocated along with the forging device 32 to roll the cladding layer 34. Thus, it can effectively eliminate the defects such as pores, cracks and so on during the formation of the cladding layer 34. Additionally, it also can change the microstructure of the final cladding layer to enhance the densification and the performance of the final part.

The forging head is not limited as the cylindrical forging hammer or the roller mentioned in the above embodiments. It may be forging heads of other shapes, which can be used to forge the forging layer during formation of the cladding layer.

Figure 4:
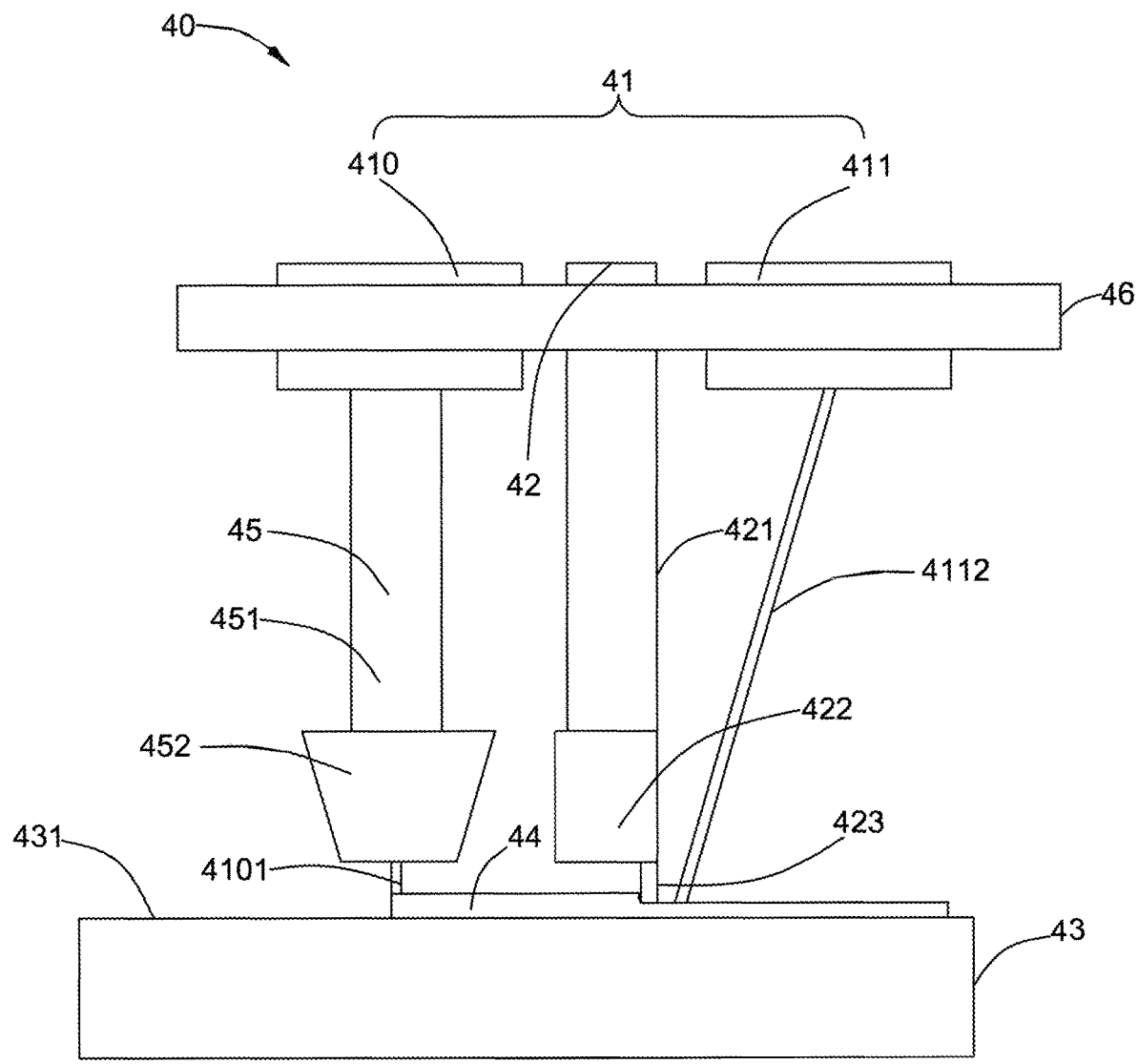
FIG. 4 is a schematic view of an additive manufacturing system in accordance with an embodiment of the present disclosure.

FIG. 4 shows a schematic of an additive manufacturing system 40 according to one embodiment. The additive manufacturing system 40 comprises an energy source device 41 and a forging device 42. The energy source device 41 comprises a first energy source 410 and a second energy source 411. The first energy source 410 emits a first energy beam 4101 to a surface 431 of a substrate 43. The second energy source 411 emits a second energy beam 4112 to the surface 431 of the substrate 43.

The additive manufacturing system 40 further comprises a feeding device 45 located below the first energy source 410. The feeding device 45 comprises a connecting mechanism 451 and a feeding mechanism 452. The connecting mechanism 451 is configured to connect the feeding device 45 to the first energy source 410 so that the feeding device 45 and the first energy source 410 can be linked. The feeding device 45 can move together with the first energy source 410. The feeding mechanism 452 comprises a feeding nozzle. Of course, the feeding mechanism 452 may comprise feeding mechanisms of other shapes, such as a powder feeder, a wire feeder, and so on. The feeding mechanism 452 is used to add a material to the surface 431 of the substrate 43. The feeding device 45 further comprises a hollow structure through which the first energy beam 4101 can pass to fuse the material added by the feeding mechanism 452 for forming the cladding layer 44 on the substrate 43.

The forging device 42 comprises a base portion 421, a fixing portion 422 located below the base portion 421, and a forging head 423 fixed to the fixing portion 422. The forging device 42 is disposed between the first energy source 410 and the second energy source 411 and can be linked with the first energy source 410 and the second energy source 411. When the first energy source 410 and the second energy source 411 move, the forging device 42 can move together to drive the forging head 423 to move along with the forging device 42.

The components, working principle, operating process and parameters of the additive manufacturing system 40 shown in FIG. 4 is basically the same as those of the additive manufacturing system shown in FIG. 1 to FIG. 3, and will not be described in detail herein again. The main difference is that the energy source device 41 comprises two independent energy sources, namely the first energy source 410 and the second energy source 411. The first energy beam 4101 is emitted from the first energy source 410. The second energy beam 4112 is emitted from the second energy source 411. The first energy source 410, the second energy source 411, and the forging device 42 are connected by the connecting device 46 so that the first energy source 410, the second energy source 411 and the forging device 42 can be linked. Of course, the first energy source 410, the second energy source 411 and the forging device 42 can also move independently. The first energy beam 4101 is perpendicular to a surface of the cladding layer 44. The second energy beam 4112 is obliquely emitted by the second energy source 411, and may not be perpendicular to the surface of the cladding layer 44.

The forging head 423 can forge the cladding layer 44 along a track of the first energy beam 4101 during the first energy beam 4101 fusing the material to form the cladding layer 44 on the substrate 43. The second energy beam 4112 can move along a track of the forging head 423. Thus, the second energy beam 4112 can heat a desired in-situ forging area of the cladding layer 44 near the forging head 423. In this way, the additive manufacturing system 40 can realize heating the desired in-situ forging area of the cladding layer 44 when forming the cladding layer 44 followed by the in-situ forging by the forging head 423. The additive manufacturing system 40 can effectively eliminate the defects such as pores, cracks and so on during the formation of the cladding layer 44. It can change the microstructure of the final cladding layer, and enhance the densification and performance of the final part. Additionally, it can reduce damage to the forging head 423 so as to prolong the life of the forging head 423.

Figure 5:
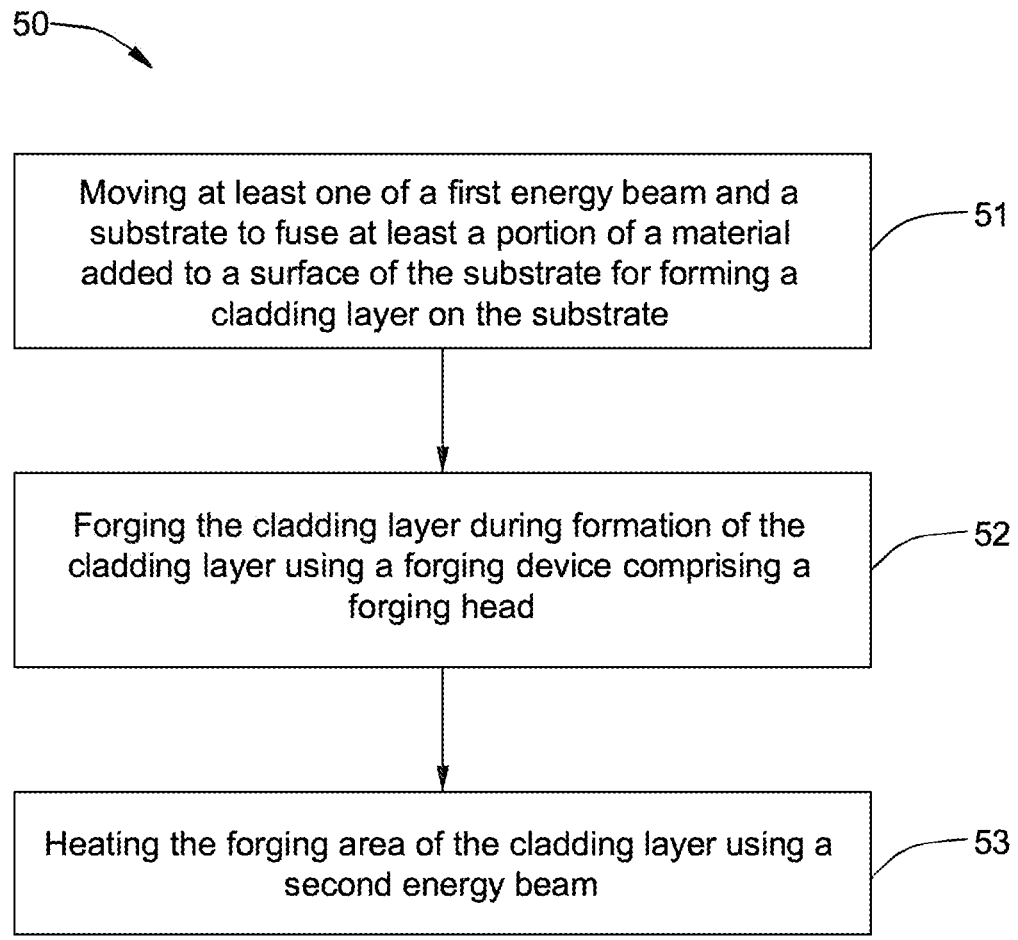
FIG. 5 illustrates an exemplary process of an additive manufacturing method, in accordance with an embodiment of the present disclosure.

FIG. 5 shows a schematic process of an additive manufacturing method 50 according to one embodiment. The additive manufacturing method 50 comprises: step 51 of moving at least one of a first energy beam and a substrate to fuse at least a portion of a material added to the surface of the substrate for forming a cladding layer on the substrate; step 52 of forging the cladding layer during formation of the cladding layer using a forging device comprising a forging head; and step 53 of heating a forging area of the cladding layer using a second energy beam. The step 52 and the step 53 of the additive manufacturing method 50 according to the embodiment of the present disclosure do not have a strict sequence. Step 52 of the additive manufacturing method 50 specifically comprises moving the forging head along a track of forming the cladding layer. Thus, it can enable forge the whole cladding layer by the forging head.

In some embodiment, moving the first energy beam relative to the substrate for fusing at least a portion of a material added to a surface of the substrate and forming a cladding layer on the substrate. In some embodiments, moving the substrate relative to the first energy beam also for fusing at least a portion of a material added to a surface of the substrate and forming a cladding layer on the substrate. In some embodiments, moving the first energy beam and the substrate at same time on a same movement direction for fusing at least a portion of a material added to a surface of the substrate and forming a cladding layer on the substrate.

In the additive manufacturing method 50, in order to realize forging the cladding layer during formation of the cladding layer, the desired forging area of the cladding layer near the forging head needs to maintain a relatively stable forging temperature. Thus, it can enable in-situ hot forging take place during the formation of the cladding layer. A distance between a first contacting point where the first energy beam contacts the cladding layer and a second contacting point where the second energy beam contacts the cladding layer is greater than a distance between the second contacting point and a third contacting point between the forging head and the cladding layer. The distance between the first contacting point and the second contacting point is greater than or equal to 5 millimeters. The distance between the second contacting point and the third contacting point is greater than or equal to 15 millimeters.

In the additive manufacturing method of the present disclosure, the cladding layer can be forged during the formation of the cladding layer. And it can realize hot forging of the cladding layer by heating the desired forging area of the cladding layer. It can effectively reduce the damage to the forging head of the forging device and improve the productivity of the additive manufacturing method. Additionally, it can effectively reduce the defects, such as cracks, pores and so on during formation of the cladding layer. Thus, the microstructure of the final cladding layer can also be modified so as to enhance the densification and performance of the final part produced.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. An additive manufacturing system, comprising:
   an energy source device for providing a first energy beam and a second energy beam; and
   a forging device spaced from the energy source device, the forging device comprising a fixing portion and a forging head, the forging head connecting to the fixing portion and defining an inner passage extending vertically therethrough;
   wherein the first energy beam and a substrate are configured to move relative to each other to fuse at least a portion of a material added to a surface of the substrate for forming a cladding layer on the substrate;
   wherein the forging head is configured to forge the cladding layer during formation of the cladding layer; and
   wherein the second energy beam is configured to pass from outside the fixing portion vertically through the inner passage of the fixing portion, and to heat a solid forging area of the cladding layer.

2. The additive manufacturing system of claim 1, wherein the forging head and the substrate are configured to move relative to each other along a track forming the cladding layer formed by the first energy beam.

3. The additive manufacturing system of claim 1, wherein a distance between a first contacting point where the first energy beam is configured to contact the cladding layer and a second contacting point where the second energy beam is configured to contact the cladding layer is greater than a distance between the second contacting point and a third contacting point where the forging head is configured to contact the cladding layer.

4. The additive manufacturing system of claim 3, wherein the distance between the first contacting point and the second contacting point is greater than or equal to 5 mm.

5. The additive manufacturing system of claim 3, wherein the distance between the first contacting point and the second contacting point is about 10 to 80 mm.

6. The additive manufacturing system of claim 3, wherein the distance between the second contacting point and the third contacting point is less than or equal to 15 mm.

7. The additive manufacturing system of claim 1, wherein the second energy beam is arranged between the first energy beam and the forging head.

8. The additive manufacturing system of claim 1, wherein the forging head is arranged between the first energy beam and the second energy beam.

9. The additive manufacturing system of claim 1, wherein the energy source device comprises an energy source, from which the first energy beam and the second energy beam are emitted.

10. The additive manufacturing system of claim 1, wherein the energy source device comprises a first energy source and a second energy source, the first energy beam is emitted from the first energy source, and the second energy beam is emitted from the second energy source.

11. The additive manufacturing system of claim 1, wherein the forging device comprises a base portion connected to the fixing portion opposite the forging head.

12. The additive manufacturing system of claim 1, wherein the first energy beam or the second energy beam is selected from the group consisting of a laser beam, an electron beam, a plasma arc beam, and a combination thereof.

13. The additive manufacturing system of claim 1, further comprising a feeding device for adding the material during the formation of the cladding layer.

14. The additive manufacturing system of claim 1, wherein the forging head comprises a hammer.

15. The additive manufacturing system of claim 1, wherein the forging head comprises a roller.

* * * * *